(12) United States Patent
Pireyre et al.

(10) Patent No.: US 9,982,603 B2
(45) Date of Patent: May 29, 2018

(54) TURBOMACHINE SPARKPLUG FIXING ASSEMBLY

(71) Applicant: Snecma, Paris (FR)

(72) Inventors: Pierre-François Simon Paul Pireyre, Moissy Cramayel (FR); Francois Leglaye, Moissy Cramayel (FR); David Gino Stifanic, Moissy Cramayel (FR)

(73) Assignee: SNECMA, Paris (FR)

( * ) Notice: Subject to any disclaimer, the term of this patent is extended or adjusted under 35 U.S.C. 154(b) by 25 days.

(21) Appl. No.: 15/106,162

(22) PCT Filed: Nov. 26, 2014

(86) PCT No.: PCT/FR2014/053037
§ 371 (c)(1),
(2) Date: Aug. 30, 2016

(87) PCT Pub. No.: WO2015/097355
PCT Pub. Date: Jul. 2, 2015

(65) Prior Publication Data
US 2016/0369701 A1 Dec. 22, 2016

(30) Foreign Application Priority Data

Dec. 23, 2013 (FR) ...................................... 13 63487

(51) Int. Cl.
*F02C 7/266* (2006.01)
*H01T 13/08* (2006.01)
(Continued)

(52) U.S. Cl.
CPC ................ *F02C 7/266* (2013.01); *F02C 3/14* (2013.01); *F23R 3/002* (2013.01); *F23R 3/10* (2013.01);
(Continued)

(58) Field of Classification Search
CPC .. F02C 7/266; F02C 7/264; F02C 7/28; F02C 7/32; F02C 7/20; F23R 3/60;
(Continued)

(56) References Cited

U.S. PATENT DOCUMENTS 3,403,511 A * 10/1968 Jaekel ...................... F02C 7/264
60/39.826
3,487,636 A * 1/1970 Scott ........................ F02C 7/266
60/39.827
(Continued)

FOREIGN PATENT DOCUMENTS

FR 991373 A 10/1951
FR 2 900 976 A1 11/2007

*Primary Examiner* — William H Rodriguez
(74) *Attorney, Agent, or Firm* — Blank Rome LLP

(57) ABSTRACT

Assembly comprising, on a turbomachine:—a combustion chamber (30) having a longitudinal axis (30a) and comprising: internal and external longitudinal walls (90) having a first opening (90a) substantially transverse to said axis (30a), an outer casing (110) having a second opening (110a) likewise substantially transverse to said axis (30a),—a turbomachine sparkplug (150),—a device (130) for radially securing the sparkplug (150), which device (130) comprises a sparkplug adapter (160) fixed toward a first end to the outer casing (110), facing the second opening (110a) and through which adapter and casing the sparkplug (150) in question passes, and a sparkplug guide (190) kept in contact with the external longitudinal wall (90), facing the first opening (90a) and through which the sparkplug (150) passes to emerge in the combustion chamber (30), the sparkplug (150) and the sparkplug guide (190) each having a screw thread (103, 105), the screw threads (103, 105) being screwed together so as to stabilize the sparkplug (150) radially to the axis (30a) of the combustion chamber (30) with respect to said external longitudinal wall (90), and—in this condition, the sparkplug (150) and the sparkplug guide (190) are mounted freely with (Continued)

respect to the outer casing (110) in a direction substantially radial to the axis of the second opening (110a).

10 Claims, 4 Drawing Sheets

(51) Int. Cl.
    *F23R 3/60*         (2006.01)
    *F02C 3/14*         (2006.01)
    *F23R 3/00*         (2006.01)
    *F23R 3/10*         (2006.01)
    *F23R 3/28*         (2006.01)

(52) U.S. Cl.
    CPC ................ F23R 3/28 (2013.01); F23R 3/60 (2013.01); H01T 13/08 (2013.01); *F05D 2220/32* (2013.01); *F05D 2240/35* (2013.01); *F23D 2207/00* (2013.01); *F23D 2209/00* (2013.01); *F23D 2211/00* (2013.01); *F23R 2900/00005* (2013.01); *F23R 2900/00012* (2013.01)

(58) Field of Classification Search
    CPC .. F23R 2900/00012; F23R 3/002; F23R 3/04; F23R 2900/00017; F05D 2240/55; H01T 13/08; H01T 13/30; F23D 2207/00
    USPC ................................ 60/39.821, 827
    See application file for complete search history.

(56) References Cited

U.S. PATENT DOCUMENTS

| | | | | |
|---|---|---|---|---|
| 3,910,036 A * | 10/1975 | Irwin | .............. | F23R 3/007 285/187 |
| 3,990,834 A * | 11/1976 | DuBell | .............. | F02C 7/18 431/264 |
| 4,903,476 A * | 2/1990 | Steber | .............. | F23R 3/283 431/264 |
| 6,152,095 A * | 11/2000 | Ripma | .............. | H01T 13/08 123/142.5 E |
| 6,920,762 B2 * | 7/2005 | Wells | .............. | F02C 7/264 60/39.821 |
| 7,013,634 B2 * | 3/2006 | Pidcock | .............. | F23R 3/002 60/39.821 |
| 7,546,739 B2 * | 6/2009 | Holland | .............. | F23R 3/06 60/39.821 |
| 8,099,963 B2 * | 1/2012 | Pieussergues | .......... | F02C 7/266 60/39.821 |
| 9,803,554 B2 * | 10/2017 | Martinez Fabre | ...... | F02C 7/264 |
| 2003/0163995 A1 * | 9/2003 | White | .............. | F23R 3/002 60/800 |
| 2005/0072163 A1 * | 4/2005 | Wells | .............. | F02C 7/264 60/796 |
| 2007/0051110 A1 * | 3/2007 | Holland | .............. | F23R 3/06 60/776 |
| 2009/0178385 A1 * | 7/2009 | Sandelis | .............. | F02C 7/266 60/39.821 |
| 2009/0199564 A1 * | 8/2009 | Pieussergues | .......... | F02C 7/266 60/752 |
| 2010/0212324 A1 * | 8/2010 | Bronson | .............. | F02C 7/264 60/752 |
| 2010/0229559 A1 * | 9/2010 | Lains | .............. | F02C 7/266 60/740 |
| 2011/0113748 A1 * | 5/2011 | Lains | .............. | F02C 7/266 60/39.827 |
| 2012/0110975 A1 * | 5/2012 | Alholm | .............. | F02C 7/266 60/39.827 |
| 2012/0227373 A1 * | 9/2012 | Bunel | .............. | F02C 7/266 60/39.827 |
| 2012/0255275 A1 * | 10/2012 | Bunel | .............. | F02C 7/266 60/39.827 |
| 2017/0108225 A1 * | 4/2017 | Bunel | .............. | F23R 3/60 |

* cited by examiner

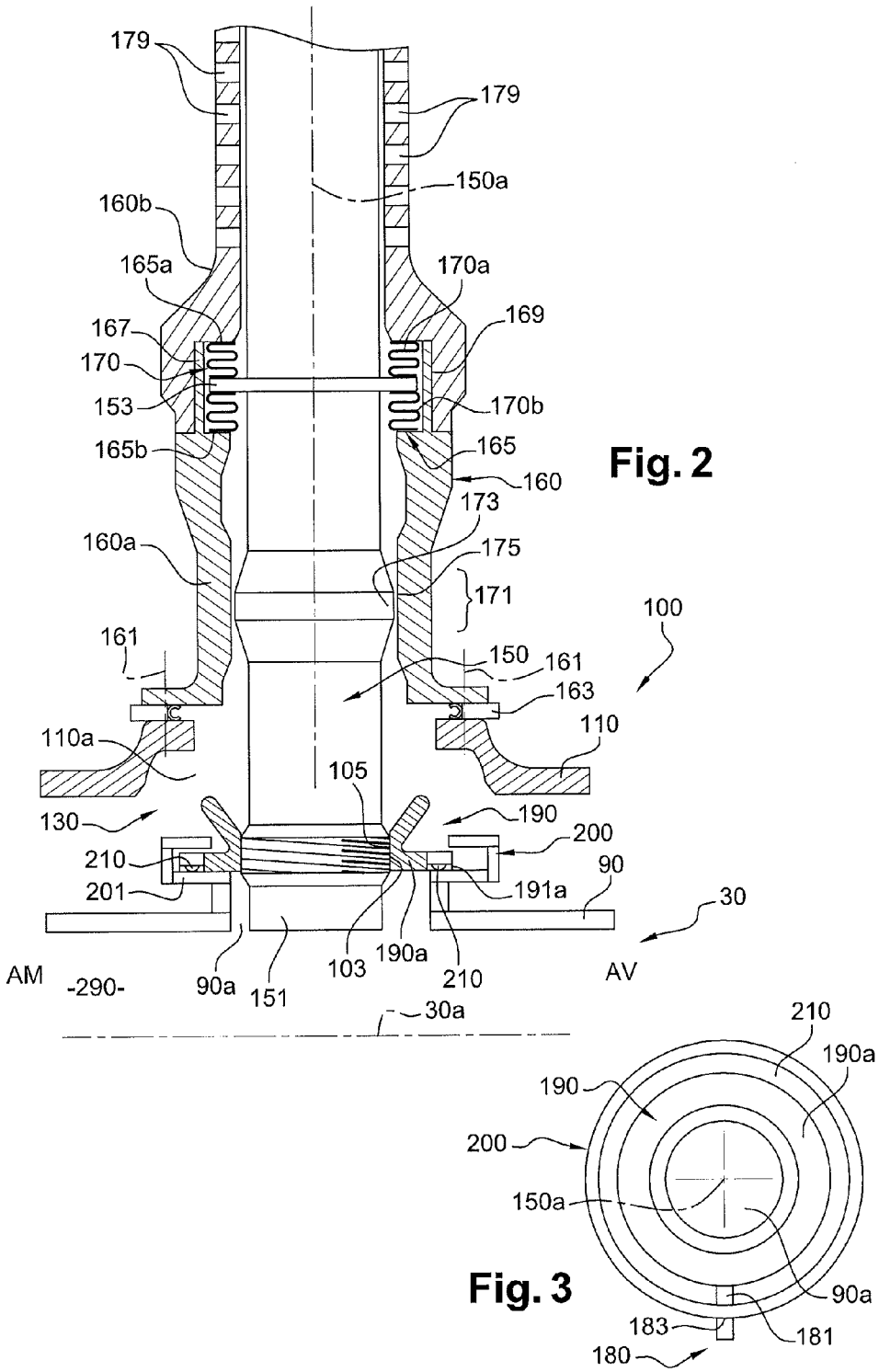

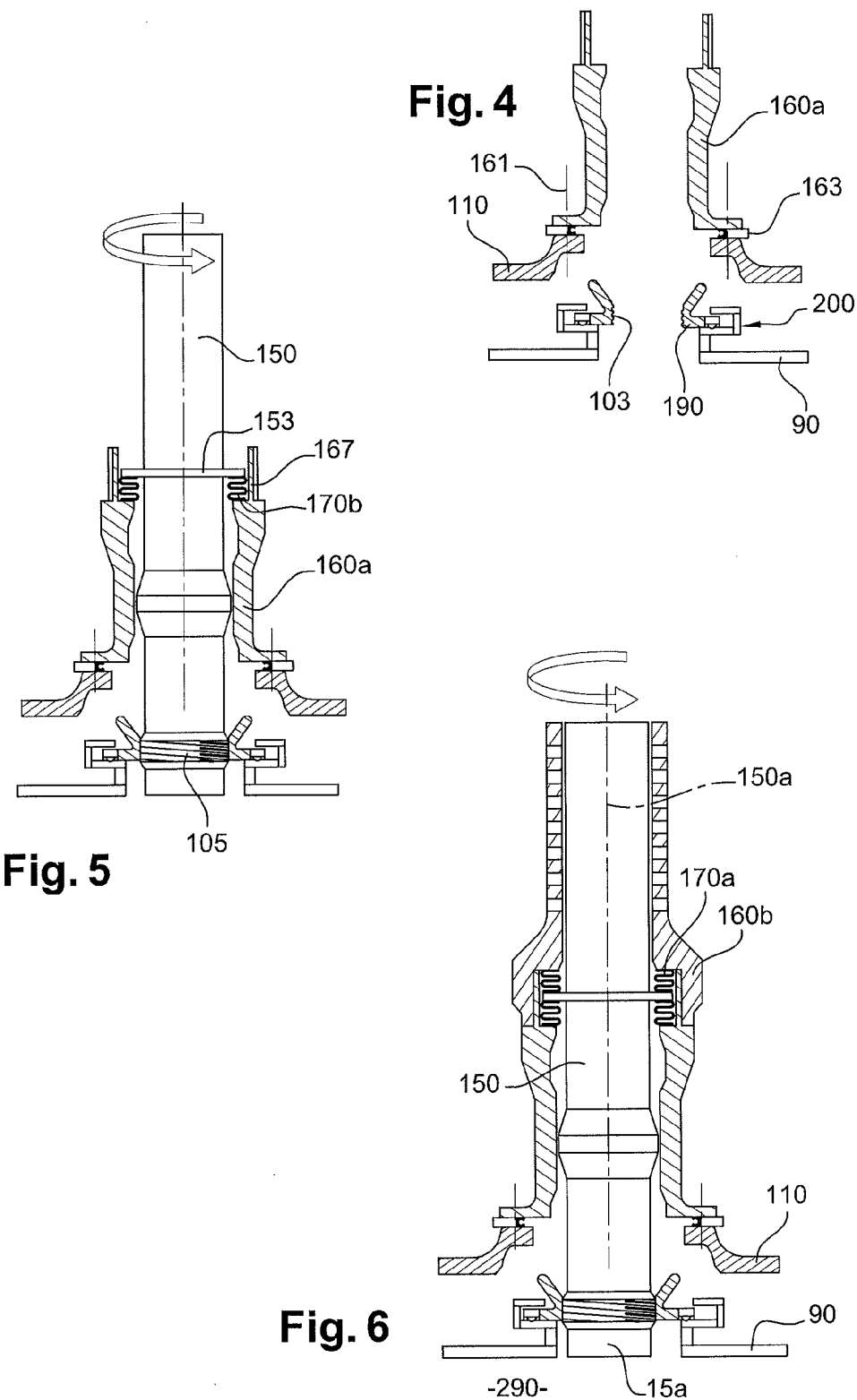

TURBOMACHINE SPARKPLUG FIXING ASSEMBLY

The present invention relates to the field of gas turbine engines and in particular the arrangement of a sparkplug in a combustion chamber.

More specifically still, it concerns a turbomachine sparkplug and a device for radially securing this sparkplug.

Hereinafter and unless the context explicitly makes it clear otherwise, the term "axial" refers to the longitudinal axis of the combustion chamber in question, "radial" refers to that which runs transversely in relation to this axis, strictly perpendicularly or not, "outer or external" is defined in relation to said longitudinal axis in relation to which that which is "inner or internal" is radially closer and is surrounded (at least in part) by that which is "exterior or external".

FIG. 1, which is an excerpt from FR-A-2900976, diagrammatically illustrates an embodiment of the prior art in which a (part of) a turbomachine 1 in which, as in the following figures, gases flow on the whole longitudinally from upstream (US) to downstream (DS).

This (part of) a turbomachine 1 comprises:
a combustion chamber 3 featuring a longitudinal axis 3a and comprising:
 an air and fuel injection device 5 substantially centred on the axis 3a of the combustion chamber, which axis extends for the most part along the longitudinal axis 1a of the turbomachine.
 (at least) one internal longitudinal wall (also known as a shell) 7 and (at least) one external longitudinal wall 9 having a first opening 9a substantially transverse to the axis 3a,—an outer casing 11 having a second opening 11a likewise substantially transverse to the axis 3a of the combustion chamber,
a device 13 for securing the sparkplug 15, wherein this device comprises:
 a sparkplug adapter 16 fixed towards a first end to the outer casing 11, facing the second opening 11 and through which adapter and casing the sparkplug 15 passes,
 a sparkplug guide 19 kept in contact with the external longitudinal wall 9, facing the first opening 9a and through which the sparkplug passes to emerge in the combustion chamber.

The combustion chamber 3 is enclosed in an annular space, formed by the outer casing 11 and the inner annular wall 17, concentric to the shafts, not illustrated, linking the turbine block to the compressor block of the turbomachine. The (or each) external shell 9 is equipped with a flange, or support, 21, for connection with the outer casing 11 and the (or each) internal shell 7 is equipped with another flange, or support, for connection (fastening) to the internal annular wall 17. The space defined radially by the internal 7 and external 9 shells contains upstream a transverse chamber bottom 25 together with upstream fairings. Several fuel injectors distributed around the longitudinal axis of the turbomachine (such as the tube 27, which terminates along the axis 3a) emerge in the inner volume 29 of the combustion chamber through the chamber bottom 25. Deflectors 31 form a bowl around each inlet tube and divert a portion of the air that has entered the streamlined area 29 towards the atomised fuel in a radial and swirling direction, thereby ensuring formation of a mixture of fuel with the air. A primary combustion zone may be formed downstream from the chamber bottom in which (zone) the mixture is ignited by the sparkplug 15 or several such sparkplugs distributed circumferentially. A portion of the air derived from the compressor and arriving via the diffuser 32 circumvents the fairing formed by the shells 7 and 9, is guided in the annular spaces 33 and 35 between the inner volume 29 of the chamber 3 and the two outer 11 and inner 17 casings, respectively and is subsequently introduced into this volume 29 downstream from the primary combustion zone (orifices 37, 39) in order to form the engine gas flow which is distributed towards the downstream turbine rotor not illustrated.

The sparkplug 15 passes through the casing 11 via the orifice 11a and extends radially inwards until it is substantially flush with the external shell 9 through the orifice 9a. The sparkplug 15 is held on the outer casing 11 by the sparkplug adapter 16 through which it passes.

The sparkplug adapter 16 comprises a tubular section forming a cylindrical recess, a part of which is threaded and in which the sparkplug is held by screw-fitting. The tubular section is associated with a plate, perpendicular to the cylindrical recess, which (plate) is provided with drill holes for securing components attaching the adapter to the outer casing 11. The sparkplug 15, at its front end and facing the orifice 9a, passes through the sparkplug guide 19, which is installed in a shaft 20 surrounding the orifice 9a and permanently interdependent with the outer casing 11. The sparkplug guide forms a floating bushing that encircles the sparkplug and comprises a flange 19a, radial in relation to the latter, slidingly mounted between corresponding guiding surfaces interdependent with the shaft 20 and maintaining a seal.

In the conventional manner, the sparkplug 15 is cooled by the air circulation in the space 33, by impingement of air passing through the sparkplug guide 19 and by conduction on the outer part of the sparkplug adapter.

Particularly in the case of a low-voltage sparkplug, the factors limiting its service life are mainly:
 breakdown of the sparkplug under a high voltage,
 exposure of the front end of the sparkplug where the sparks are generated to fuel (or to another liquid such as water) and
 exposure of this sparkplug end to high temperatures (>600° C.). Currently, the sparkplug installation configuration described above appears on the whole satisfactory.

Nevertheless, endeavours are being made to further improve the service lives of the sparkplugs exposed to flames of increasingly high temperatures. It is certain that originally, on installation, the front (or nose) 15 of the sparkplug is positioned flush with the wall of the external shell 9 belonging to the flame tube of the combustion chamber. During operation however, this flame tube in addition to the sparkplug expands, causing the sparkplug nose to emerge from the film of protective air and therefore enter the flame (hot gases), with the most extreme conditions.

Under these conditions, one aim involves encouraging maintenance of a substantially constant radial position of the sparkplug nose in relation to the flow of the flame tube with a view to extending the service life of the sparkplug and arcing of the latter (production of sparks) under all circumstances, regardless of the operating phase of the turbomachine.

Hence, in order to work towards this aim, an assembly of the aforementioned overall type is proposed, comprising a turbomachine sparkplug and a device for radially securing this sparkplug to a (part of the) turbomachine, which comprises:

a combustion chamber featuring a longitudinal axis and comprising:
an air and fuel injection device,
(at least) one internal longitudinal wall (or shell) and (at least) one external longitudinal wall having a first opening substantially transverse to said axis,
an outer casing having a second opening also substantially transverse to the axis of the combustion chamber,
the sparkplug securing device, which device comprises:—a sparkplug adapter fixed towards a first end to the outer casing, facing the second opening and through which adapter and casing the sparkplug in question passes and
a sparkplug guide kept in contact with the external longitudinal wall, facing the first opening and through which the sparkplug passes to emerge in the combustion chamber,
wherein said assembly is characterised in that the sparkplug and the sparkplug guide each have a screw thread, the screw threads being screwed together so as to stabilise the sparkplug radially to the axis of the combustion chamber, with respect to said external longitudinal wall.

Through optimal radial positioning of the sparkplug nose in relation to the flame tube and therefore to the external shell, it will therefore be possible to improve the ignition capability of the turbomachine on the ground and in flight.

In order to promote freedom of dilation of the chamber in relation to the outer casing, it is furthermore recommended that the sparkplug and sparkplug guide should both be installed freely in relation to this casing, in a direction substantially radial to the axis of the second opening.

Another difficulty may also arise from the friction of the sparkplug guide against the walls of the annular boss of the external longitudinal wall receiving it.

Indeed, under certain operating conditions of the turbomachine, the sparkplug and sparkplug guide are radially stressed towards the outer casing which is not stressed in the same way. Friction of the sparkplug guide against the respective wall of the annular boss of the external longitudinal wall may in this case occur. In order to facilitate sliding of the sparkplug guide, particularly substantially in the axial direction, in a more general sense during the radial and/or axial dilation phases of the walls of the inner enclosure of the combustion chamber in relation to the casing, which are phases during which the sparkplug may exert axial force on the external shell, it is proposed that a substantially axial means of sliding be interposed between the sparkplug guide and the respective wall of the annular boss of the external longitudinal wall. To this end, provision may be made for ball bearings; another possible solution for means of sliding: a choice of the materials in contact that encourages sliding in order to reduce the mutual friction coefficient (such as a ceramic-based coating, consisting for example of a material of the sol-gel type, or carbon/graphite with self-lubricating properties).

During operation of the turbomachine, the space under the outer casing must furthermore be hermetically insulated against the gases of zones located further outwards radially.

It is therefore important to promote a seal between the nose of the sparkplug and its opposite end.

It is therefore recommended that in the sparkplug adapter, the sparkplug should be equipped with a collar surrounding the latter locally and joined (preferably by compression) with at last one seal arranged in abutment between an inner edge of the sparkplug adapter and the collar.

In order to optimise this seal, it is even proposed to make provision for several seals comprising first and second deformable seals arranged on either side of the collar in order to ensure a seal on either side of this collar: when one seal expands radially, the other seal is compressed. It is recommended that both seals be balanced so as not to transmit (almost) any radial force to the chamber on installation.

In order to allow external cooling of the sparkplug and dilute any minor leaks at the sparkplug collar site, it is furthermore proposed that the sparkplug adapter should have, towards a second end opposite to the first, bailer holes to allow passage of air between the inside and outside of the sparkplug adapter.

Furthermore, in order to facilitate both assembly and disassembly of the sparkplug adapter, particularly in order to be able to replace the sparkplug, it is proposed that said sparkplug adapter should have a first and a second portion joined in order to be assembled together and disassembled relation to one another substantially parallel to the axis of the second opening in the outer casing, preferably in an area surrounding the seal(s) where, preferably, the collar lies, if provision is made for the latter.

Account has also been taken of a further two requirements:
controlled positioning of the sparkplug in the sparkplug adapter, along the longitudinal axis of said sparkplug which is its assembly/disassembly axis, thereby avoiding any impact on the sparkplug service life or impairing that of the adapter,
in addition to reducing the vibrations of the sparkplug when the turbomachine is operating.

Taking account of these aspects is illustrated by the fact that the sparkplug and sparkplug adapter are preferably to be equipped with centering systems locally comprising a bead around the sparkplug, wherein this bead is peripherally closer to the internal surface opposite the sparkplug adapter than the surfaces opposite the sparkplug and the adapter are from one another elsewhere along the longitudinal axis of the sparkplug. This solution, preferred to that which is possible, of a bead (or any other local restriction of internal section) on the internal surface of the adapter is designed to avoid impacting the operations of assembly/disassembly of the sparkplugs.

A specific solution for realising these centering system involves using a spherical bearing instead of a cylindrical bearing and increasing the play between the sparkplug and peripherally, the internal surface of the rearmost (outer) part of the sparkplug adapter in order to limit hyperstatism and give greater flexibility to the sparkplug in case of tilting of the shells and therefore of the combustion zone. A risk of this solution lies however in a possible increase in the vibrations of the sparkplug around its spherical bearing and more rapid wear of the latter. Now, although the sparkplug is a consumable that needs replacing owing to safety constraints in terms of producing sparks, it is typically endeavoured to avoid creating pre-identified sources of potential problems. Hence, a centering solution using a cylindrical bearing is not ruled out.

It will furthermore be noted that apart from this "turbomachine sparkplug and device for radially securing the sparkplug" assembly, the invention also relates to a turbomachine comprising this assembly, including the combustion chamber and the outer casing.

In conjunction with the above, a number of aspects of that which has been previously described will be now be studied in further detail with reference to the appended drawings in which:

FIG. 2 shows, along the same section but an enlarged, more local view (area II) of the sparkplug and its assembly environment (in a version corresponding, as in the subsequent figures, to a part at least of the updated solutions presented here);

FIG. 3 shows, in a front view, an anti-rotation system applied to the sparkplug guide;

FIGS. 4, 5 and 6 show, in a view like that in FIG. 2, three successive stages of assembly of the sparkplug and the sparkplug adapter;

Figure 1:
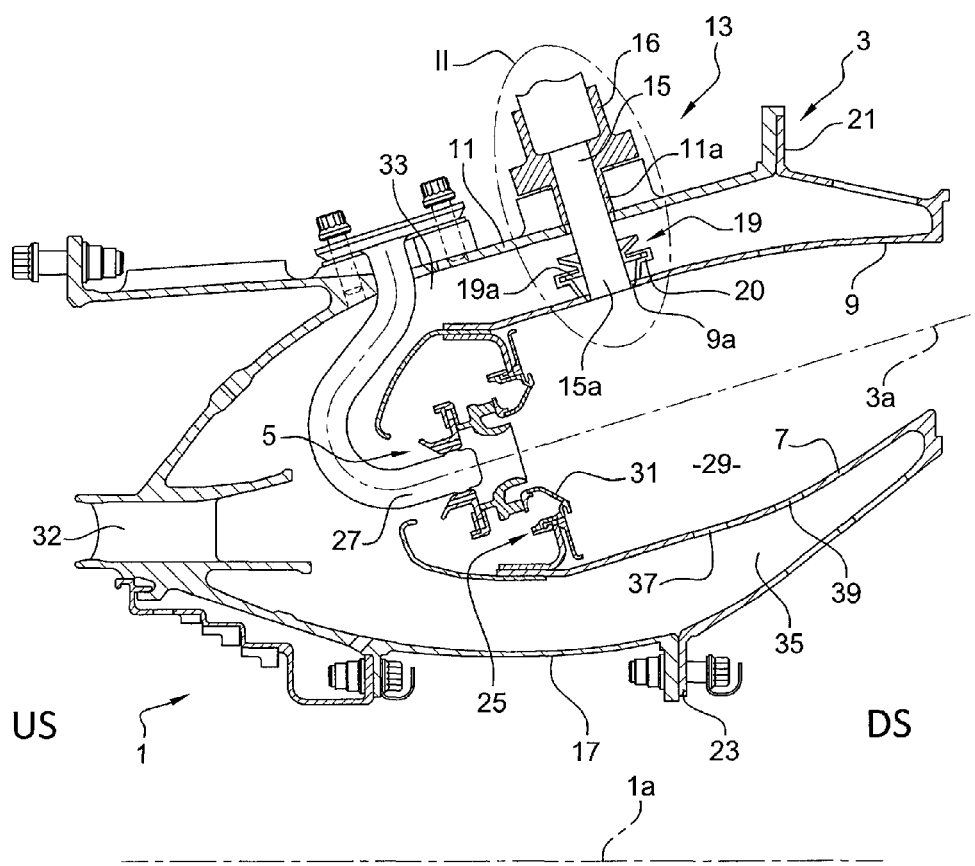
FIG. 1 shows in longitudinal cross-section a portion of a gas turbine engine combustion chamber according to an example of the prior art.

FIG. 2 and the following figures therefore represent an updated version associated with the invention which is the subject of claim 1.

In these figures, the components or elements corresponding to each other have been referenced with an additional "0". The sparkplug 15 therefore becomes 150.

Hence, particularly in FIG. 2, claimed assembly 100 can be seen, comprising the turbomachine sparkplug 150 and the device 130 for radially securing the sparkplug. In this figure, or in its environment on the turbomachine, assuming (same-scale) replacement of area II in FIG. 1 by the illustration in FIG. 2, one finds:

the combustion chamber 30 with its axis 30a comprising:
the longitudinal wall or external shell 90 and the longitudinal wall or internal wall, which delimit between them, radially to the axis 30a, the inner volume 290 of the combustion chamber,
the first opening 90a of the external shell 90,
the outer casing 110,
the securing device 130 including the sparkplug adapter 130 fixed to the outer casing 110, facing the second opening 110a also substantially transverse to the axis 30a and the sparkplug guide 190 kept in contact with the external shell 90, facing the opening 90a,
the shaft 200 permanently interdependent with the outer casing 11 and surrounding the orifice 90a, in the intermediary space between the outer casing 110 and the external shell 90.
the sparkplug 150 which passes through the openings 90a, 110a, the sparkplug
adapter 160, the shaft 200 and the sparkplug guide 190, to emerge in the space 290.

The sparkplug adapter 160, which therefore extends outside the combustion chamber 30, is fixed (typically screwed) from the outside to the outer casing 110, around the opening 110a; refer to the attachments symbolised in 161 FIG. 2. A seal 163 is interposed between them.

Unlike the solution described in connection with FIG. 1, wherein the sparkplug adapter 16 comprises a cylindrical recess, one part of which is threaded and in which the sparkplug is held by screw-fitting, the sparkplug 150 passes freely (without screw-fitting) through the sparkplug adapter 160, but is on the other hand screwed (unscrewably) to the sparkplug guide 190 at the position where it passes through the latter.

Screw-fitting the sparkplug in this environment would at the outset appear inappropriate owing to the proximity to the hottest areas where the thermal gradients are highest and therefore a potential problem particularly of unscrewing for replacement of this sparkplug. Not screwing the sparkplug directly on to the shaft 200, but instead on (in) the sparkplug guide 190 has however proved to be the solution, particularly owing to the already known movement capacity of the sparkplug guide in relation to the shaft and therefore the external shell, while having a relative movement capacity between the sparkplug and the sparkplug adapter.

Hence, the preferred solution in FIG. 2 involves:
free assembly of the sparkplug through the sparkplug adapter 160, its being specified that this assembly is however guided transversally to the axis 150a of assembly/disassembly of this sparkplug (refer to two possible solutions below),
in addition to inner and outer screw threads 103, 105 respectively in the sparkplug guide (tapping of the flange 190a) and around the sparkplug, slightly to the rear of its nose 151 which therefore emerges in the volume 290 and bears the electrode(s), wherein these screw threads are screwed together in order to stabilise the sparkplug substantially radially to the axis 30a, in relation to the external longitudinal wall 90.

Hence, one may, during operation, aim at a substantially constant radial position of the nose of the sparkplug in relation to and flush with this external shell 90, which was not allowed by the solution in FIG. 1 with screw-fitting on the sparkplug adapter.

Figure 7:
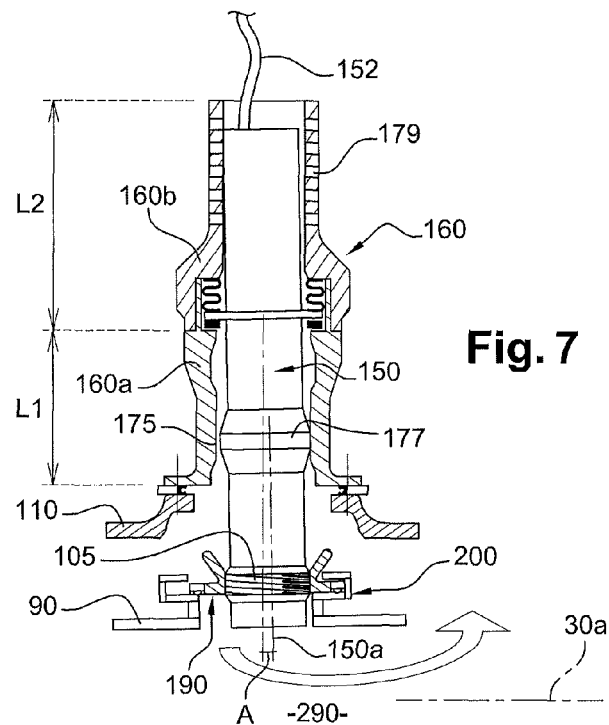
FIG. 7 shows, still in a view like that in FIG. 2, a solution comprising a spherical bearing on the sparkplug
Figures 8, 9, 10:
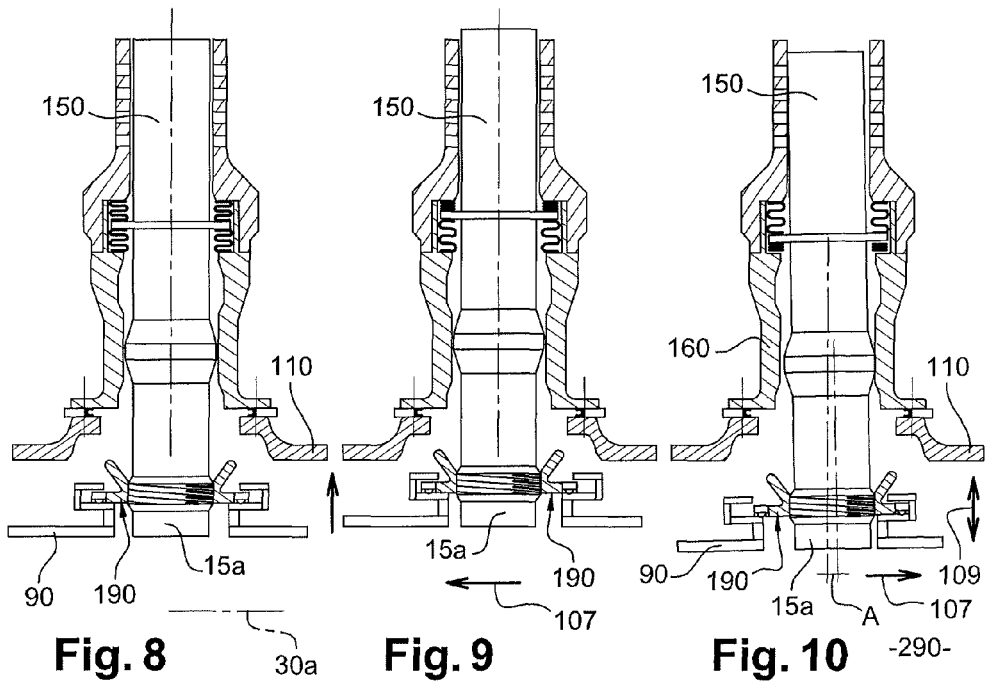
FIGS. 8, 9 and 10 show, again in a view like that of FIG. 2, three situations for relative positioning of the sparkplug, the sparkplug guide and the sparkplug adapter, in addition to, therefore, the external shell and the outer casing.

It can furthermore be seen in FIG. 2 and above all in the simulated situations in FIGS. 8-10 that, in order to be able to follow the fairly varied inter-component movements that may occur in the area in question here, as a function of the operating conditions (on the ground, in flight, at different engine speeds . . . ), the sparkplug 1 (supplied with electric power by the cable 152; FIG. 7) and the sparkplug guide 190 are installed with a certain freedom in relation to the outer casing 110 in a direction substantially radial to the axis of the second opening. This makes it possible in particular to follow without undue stress the dilation between the external shell 90 and the outer casing 110.

The combustion chamber is under pressure during operation. Particularly for gas-tightness between the front and rear of the sparkplug, inside the sparkplug adapter 160, the latter features an inner edge 165 and the sparkplug is equipped with a collar 153 surrounding the latter locally (transversally in relation to the axis 150a) which is positioned, when the sparkplug is in place, facing the inner edge 165. At least one seal 170 is arranged in abutment between the edge 165 and the collar and is preferably mounted compressed by this sparkplug.

In order to ensure perfect sealing and control of the permitted movements of the sparkplug, it is to be preferred that the collar 153 be installed between two inner edges 165a, 165b and that two deformable seals 170a, 170b be arranged on either side of the collar. Thus when, owing to a relative movement between the sparkplug and the sparkplug adapter along the axis 150a, one seal expands as a result, the other seal will be compressed, which will make it possible to ensuring sealing under all circumstances. Favourably, both seals are to be balanced so as, like the sparkplug, not to transmit any radial force to the chamber on assembly.

In spite of the collar 153 and the seal(s) 170, minor leaks around the collar may occur. Hence, in order to overcome this allow cooling of the sparkplug by the top (rear), it is proposed that the sparkplug adapter 160 should have, towards its (second) rear end holes 179 to allow passage of air between the inside and outside of this sparkplug adapter.

In order to facilitate sparkplug assembly/disassembly operations, it is furthermore recommended that the sparkplug adapter 160 should feature along the axis 150a a first and a second portion 160a, 160b joined in order to be assembled together and disassembled in relation to one another substantially along the axis of the second opening 110a in the outer casing (and therefore along the axis 150a), preferably in an area 167 surrounding the seal(s) and the collar 153.

Favourably, in said region, the parts 160a, 160b are to feature means 169 ensuring their mutual releasable attachment, along the axis 150a. Screw threads on cylindrical portions of both parts 160a, 160b would in particular be appropriate.

It is to be preferred that the area of the seal(s) and of the collar 153 and therefore the area 167 should be located radially on the outside (therefore to the rear) of the area 171 where the sparkplug is in particular guided in the sparkplug adapter 160.

In this respect, it is to be preferred that the sparkplug 150 and the sparkplug adapter be equipped with centering systems 173, 175 allowing positioning of the sparkplug in the adapter substantially radially to the axis of the second opening 110a and reduction in the vibrations of the sparkplug during operation. Guides also facilitate installation of the sparkplug in the adapter.

Since the sparkplug is "a consumable" to be replaced periodically, the centering means 173 on the sparkplug is favourably to be a bead in protrusion around this sparkplug. It may also prove useful that opposite, with the sparkplug installed, the sparkplug adapter 160 features an internal restriction in section forming the centering system 175.

An advantage of cylindrical centering systems 173, 175, coaxial to the axis of the second opening 110a, is to be able to provide a relatively long bearing surface and block tilting of the sparkplug and/or limit the vibrations.

A derived solution shown in FIG. 7 may however consist in making provision for a spherical bearing 177 and increasing the transverse play to the axis 150a between the sparkplug and sparkplug adapter, in this instance the upper or rear portion 160b, in order to limit hyperstatism and give greater flexibility to the sparkplug in case of tilting of the streamlined area 29 of the chamber. Once again insofar as the sparkplug is "a consumable", provision is to be made preferably for a bead with a spherical bearing 177 on the sparkplug and a cylindrical centering system 175 opposite in the sparkplug adapter 160 is to be retained. The risk of an increase in the vibrations of the sparkplug around its spherical bearing and more rapid wear of the latter may be considered prohibitive.

In order to increase the air circulation area (holes 179), but also bring the bearing and collar areas axially closer, it is advisable that along the axis 150a, the length L1 be less than that L2 of the second part 160b (refer to FIG. 7).

In FIGS. 8-10, three operating situations are illustrated, showing that there may be relative movements and/or forces that are both axial (parallel to the axis 30a; arrows 107) and radial (arrow 109).

In relation to a reference position assumed to be that of FIG. 8, the movements of compression/dilation of the seal(s) 170 and tilting of the sparkplug and sparkplug guide 190 (angle A) in relation to the outer casing 110 and the external shell 90 can be clearly seen in FIGS. 8-9. It will have been noticed that the outer casing 110 has been assumed to be fixed (reference) and the external shell 90 to be mobile in relation to the latter. Both may be caused to move in practice.

It is a constant on the other hand that the front (or nose) 15a of the sparkplug remains positioned flush with the internal surface of the external shell 90 and therefore with the inner volume 29 of the combustion chamber.

In relation with point and as already explained, in order to restrict in as far as possible the forces that the sparkplug may exert on the external shell under certain conditions particularly during the radial and/or axial dilation phases of the inner enclosure of the combustion chamber in relation to the casing, it is proposed that a substantially axial means 210 of sliding (therefore substantially parallel to the axis 30a), such as ball bearings, be interposed between the sparkplug guide 190 and the wall 201 (refer to FIG. 2) of the shaft (or annular boss) 200 of the external longitudinal wall 90. Since the potentially critical forces tend, apart from axial dilation, above all to bring the walls 90 and 110 radially close together, the means 210 of substantially axial sliding is preferably to be placed on the internal surface 191 of the flange 190a of the sparkplug guide (refer to FIG. 2).

Axial sliding of the sparkplug guide 190 will therefore be optimally encouraged during the radial and axial dilation phases of the volume 290 in relation to the casing where the sparkplug is able to exert a radial force on the shell(s).

For its maintenance and guidance, the flange 190a will move within a volume defined by the peripheral and respectively upper and lower walls of the shaft 200 (as already known).

All the more so if provision is made for means 210 of sliding, such as ball bearing or a contact material or materials with a low friction coefficient, it must be avoided that the sparkplug screwing/unscrewing operations, via the threads 103, 105, are tricky since the sparkplug guide 190 is liable to rotate on its own axis.

Consequently, provision is made for an anti-rotation means 180, such as a stop (FIG. 3) that restricts free rotation of the sparkplug guide 190 in relation to the shaft 200, around the axis 150a.

The stop 180 may comprise a tab 181 passing through with a certain amount of play a slit 183 in the shaft.

Before quickly describing the manner of installing the sparkplug and sparkplug adapter 160, one will note among the contributions of the solution presented here the possibilities offered in terms of:

reducing heating of the sparkplug nose,
increasing the sparkplug service life,
promoting the ignition capability on the ground and in flight.

Concerning this assembly, one may proceed as follows, with reference to FIGS. 4-6, assuming the sparkplug guide 190 with its threaded tapping 103 already in place in the shaft 200:—firstly, mounting of the first (radially inner) part 106a of the sparkplug adapter on the outer casing 110: the adapter is fixed by the screws 161 to a plate of the casing, with interposition of the seal 163; FIG. 4, subsequently insertion, in the centering area 167, of the radially inner seal 170b followed, on top, by the collar 153 of the sparkplug and subsequently screw-fitting of the nose of the sparkplug in the threaded bore of the sparkplug guide. The anti-rotation tab of the sparkplug guide acts. Favourably, this operation will also allow the collar 153 to slightly compress the seal 170b in order to promote the seal; FIG. 5, insertion, in the centering area 167, of the second seal 170a on top of the collar 153 and screwing together, around the sparkplug, of both parts 160a, 160b of the adapter. This operation also allows the second part 160b to slightly compress, in the axis 150a, the seal 170a, to achieve the seal; FIG. 6.

At the end, the nose 15a subsequently fits flush with the outer limit (wall 90) of the inner volume 290 of the combustion chamber, as desired and shown in FIG. 6.

With regard to application to a turbomachine 1 (particularly a turbofan or a turboprop) of the assembly 100 comprising the sparkplug 150 and its device 130 for radial securing, their installation in FIG. 1, by way of substitution for the device 13, should allow improvement of the function thereof, as mentioned above.

The invention claimed is:

1. An assembly comprising, on a turbomachine:
    an outer casing;
    a turbomachine sparkplug;
    a combustion chamber having a longitudinal axis and comprising:
        an air diffuser means and fuel injector means;
        an internal longitudinal wall and an external longitudinal wall, the external longitudinal wall having a first opening substantially transverse to the longitudinal axis, the internal and external longitudinal walls defining therebetween an inner volume of the combustion chamber which is fed with fuel through the fuel injector means and with air through the air diffuser means, wherein the internal and external longitudinal walls have orifices therethrough for feeding said inner volume with air issued from an internal annular space and an external annular space, the annular spaces communicating with the air diffuser means, said orifices located, with respect to the longitudinal axis, around the respective internal and external longitudinal walls, the external annular space being surrounded by the outer casing, and the turbomachine sparkplug, which emerges in the inner volume through the first opening, extending across the external annular space, so that the turbomachine sparkplug is cooled by said air circulating in the external annular space;
    said outer casing having a second opening, said second opening having an axis transverse to the longitudinal axis;
    a device for securing the sparkplug to the turbomachine, substantially radially to the longitudinal axis, which securing device comprises:
        a sparkplug adapter fixed towards a first end to the outer casing, facing the second opening, the sparkplug passing through the sparkplug adapter and the outer casing; and
        a sparkplug guide kept in contact with the external longitudinal wall, facing the first opening and through which the sparkplug passes to emerge in the inner volume of the combustion chamber,
    wherein:
    the sparkplug and the sparkplug guide each have a screw thread, the respective screw threads being screwed together so as to stabilise the sparkplug radially to the longitudinal axis of the combustion chamber, with respect to the external longitudinal wall,
    the sparkplug and sparkplug guide are installed freely in relation to the outer casing and the external longitudinal wall, in a direction substantially radial to the axis of the second opening,
    the sparkplug is locally surrounded by a collar cooperating with at least one seal arranged in abutment between an inner edge of the sparkplug adapter and the collar, and
    the at least one seal comprises first and second deformable seals arranged on either side of the collar in order to endure airtightness on either side of the collar, so that when one of the first and second deformable seals expands radially, the other of said first and second deformable seals is compressed.

2. The assembly according to claim 1, wherein the sparkplug guide is mounted in the external annular space and a substantially axial means of sliding is interposed between the sparkplug guide and an annular boss provided on the external longitudinal wall.

3. The assembly according to claim 1, wherein the sparkplug adapter has, towards a second end opposite the first end, holes to allow passage of air between the inside and outside of the sparkplug adapter.

4. The assembly according to claim 1, wherein the sparkplug adapter features a first part and a second part are removably assembled together, so as to be able to be disassembled in relation to one another substantially parallel to the axis of the second opening in the outer casing.

5. The assembly according to claim 1, wherein the sparkplug and sparkplug adapter are mutually equipped with centering means comprising a bead around the sparkplug.

6. The assembly according to claim 5, wherein the centering means comprise a spherical bearing around the sparkplug.

7. A turbomachine comprising the assembly according to claim 1.

8. The assembly according to claim 1, wherein the sparkplug and sparkplug guide are freely installed to tilt in relation to the outer casing and the external longitudinal wall.

9. The assembly according to claim 1, wherein the sparkplug and the sparkplug guide are installed, in said direction substantially radial to the axis of the second opening, at a distance from stops provided on the external longitudinal wall, so that the sparkplug and the sparkplug guide can tilt in relation to the outer casing and the external longitudinal wall.

10. An assembly comprising, on a turbomachine:
    an outer casing;
    a turbomachine sparkplug having a longitudinal axis;
    a combustion chamber having a longitudinal axis and comprising:
        air diffuser means and fuel injector means; and
        an internal longitudinal wall and an external longitudinal wall, the external longitudinal wall having a first opening substantially transverse to the longitudinal axis, the internal and external longitudinal walls defining therebetween an inner volume of the combustion chamber which is fed with fuel through the fuel injector means and with air through the air diffuser means, wherein the internal and external longitudinal walls have orifices there through for feeding said inner volume with air issued from an internal annular space and an external annular space, the annular spaces communicating with the air diffuser means, said orifices located, with respect to the longitudinal axis, around the respective internal and external longitudinal walls, the external annular space being surrounded by the outer casing, and the turbomachine sparkplug, which emerges in the inner volume through the first opening, extending across the external annular space, so that the turbomachine sparkplug is cooled by said air circulating in the external annular space;

said outer casing having a second opening, said second opening having an axis transverse to the longitudinal axis;

a device for securing the sparkplug to the turbomachine, radially to the longitudinal axis, which securing device comprises:
- a sparkplug adapter fixed towards a first end to the outer casing, facing the second opening, the sparkplug passing through the sparkplug adapter and the outer casing; and
- a sparkplug guide kept in contact with the external longitudinal wall, facing the first opening and through which the sparkplug passes to emerge in the inner volume of the combustion chamber;

wherein:
the sparkplug and the sparkplug guide each have a screw thread, the respective screw threads being screwed together so as to stabilise the sparkplug radially to the longitudinal axis of the combustion chamber, with respect to the external longitudinal wall, the sparkplug and sparkplug guide are installed freely in relation to the outer casing and the external longitudinal wall, in a direction substantially radial to the axis of the second opening, the sparkplug is locally surrounded by a collar cooperating with at least one seal arranged in abutment between an inner edge of the sparkplug adapter and the collar, the sparkplug and sparkplug adapter are mutually equipped with centering means comprising a bead around the sparkplug, and said centering means are inwardly shifted relative to the collar, on the longitudinal axis of the sparkplug, substantially radially to the longitudinal axis.

* * * * *